US007228006B2

(12) United States Patent
Stubler et al.

(10) Patent No.: US 7,228,006 B2
(45) Date of Patent: Jun. 5, 2007

(54) METHOD AND SYSTEM FOR DETECTING A GEOMETRICALLY TRANSFORMED COPY OF AN IMAGE

(75) Inventors: Peter O. Stubler, Rochester, NY (US); Nathan D. Cahill, West Henrietta, NY (US)

(73) Assignee: Eastman Kodak Company, Rochester, NY (US)

( * ) Notice: Subject to any disclaimer, the term of this patent is extended or adjusted under 35 U.S.C. 154(b) by 694 days.

(21) Appl. No.: 10/304,023

(22) Filed: Nov. 25, 2002

(65) Prior Publication Data

US 2004/0103101 A1 May 27, 2004

(51) Int. Cl.
G06K 9/36 (2006.01)
G06K 9/40 (2006.01)
(52) U.S. Cl. .................................... 382/286
(58) Field of Classification Search ................ 382/286, 382/294, 289, 291, 295, 296, 298, 299, 195, 382/100; 348/42, 745; 707/104
See application file for complete search history.

(56) References Cited

U.S. PATENT DOCUMENTS

| 5,911,139 | A | | 6/1999 | Jain et al. ..................... 707/3 |
| 6,094,507 | A | * | 7/2000 | Monden ..................... 382/195 |
| 6,456,340 | B1 | * | 9/2002 | Margulis ..................... 348/745 |
| 6,552,742 | B1 | * | 4/2003 | Seta ............................. 348/42 |

(Continued)

FOREIGN PATENT DOCUMENTS

EP          0 990 997 A1       4/2000

OTHER PUBLICATIONS

"The Detection of Duplicates in Document Image Databases" by David Doermann, Huiping Li, Omid Kia, and Kemal Kilic. Proceedings of the International Conference on Document Analysis and Recognition, 1997.

(Continued)

Primary Examiner—Amir Alavi
(74) Attorney, Agent, or Firm—Robert L. Walker

(57) ABSTRACT

A method for detecting a geometrically transformed copy of content in at least a portion of an image, comprises the steps of: (a) providing first and second digital images; (b) searching for objects of interest within each digital image; (c) identifying pairs of corresponding objects of interest in the digital images, wherein each pair of corresponding objects of interest comprises a located object of interest in the first digital image and a corresponding located object of interest in the second digital image that corresponds to the located object of interest in the first image; (d) locating feature points on each located object of interest in each digital image; (e) matching feature points on the located object of interest in the first digital image to the feature points on the corresponding object of interest in the second digital image, thereby generating a set of correspondence points for each image; (f) determining parameters of a geometric transformation that maps the set of correspondence points in the first digital image into the set of correspondence points in the second digital image; (g) transforming the first digital image according to the parameters of the geometric transformation determined in step (f); and (h) detecting regions of similarity between the content of the transformed first digital image and the second digital image, thereby determining if the second image contains a region that is a geometrically transformed copy of a region in the first image.

49 Claims, 6 Drawing Sheets

U.S. PATENT DOCUMENTS

| | | | |
|---|---|---|---|
| 6,744,933 B2* | 6/2004 | Lai et al. | 382/294 |
| 6,792,128 B1* | 9/2004 | Nguyen | 382/100 |
| 6,941,323 B1* | 9/2005 | Galperin | 707/104.1 |
| 6,990,213 B2* | 1/2006 | Donescu | 382/100 |

OTHER PUBLICATIONS

"Image Matching" by Robert M. Haralick and Linda G. Shapiro. Computer and Robot Vision, vol. II, Chapter 16, Addison Wesley, 1993.

"A Robust Technique for Matching Two Uncalibrated Images Through the Recovery of the Unknown Epipolar Geometry" by Zhengyou Zhang, Rachid Deriche, Olivier Faugeras, Quang-Tuan Luong. INRIA Research Report No. 2273, May 1994.

"A Direct Method for Stereo Correspondence based on Singular Value Decomposition" by Maurizio Pilu. Proc. CVPR, pp. 261-266, 1997.

"The Elements of Integration and Legesgue Measure" by R. Bartle. John Wiley & Sons, 1995, pp. 52-64.

"Digital Image Processing" by Rafael C. Gonzalez and Richard E. Woods. Addison-Wesley, 1992. pp. 185-187, 518-548.

"Detecting Faces In Images: A Survey" by Ming-Hsuan Yang, David Kriegman, Narendra Ahuja. IEEE Trans. Pattern Analysis and Machine Intelligence, vol. 24, No. 1, pp. 34-58, 2002.

"Face Recognition: A Literature Survey" by W. Zhao, R. Chellappa, A. Rosenfeld, and P.J. Phillips. University of Maryland, Center for Automation Research Technical Report, CAR-TR-948, 2000.

"An Automatic Facial Feature Finding System for Portrait Images" by Mark R. Bolin and Shoupu Chen. Proceedings of the 55th Annual Conference of the Society for Imaging Science and Technology (PICTS 2002), pp. 226-231.

"Digital Image Processing" by William K. Pratt. Second Edition. John Wiley & Sons, 1991, pp. 112-117.

"Eigenfaces for Recognition" by Matthew Turk and Alex Pentland. Journal of Cognitive Neuroscience, vol. 3, No. 1, 1991, pp. 71-86.

Jaimes A. et al., "Duplicate Detection In Consumer Photography and News Video" Proceedings ACM Multimedia 2002. 10th International Conference on Multimedia, Juan-Les-Pins, France, Dec. 1-6, 2002, ACM International Multimedia Conference, New York, NY: ACM, US, vol. Conf. 10, Dec. 1, 2002, pp. 423-424, XP001175040 ISBN: 1-58113-620-X, *the whole document*.

Flusser J, "Object Matching By Means Of Matching Liklihood Coefficients" Pattern Recognition Letters, North-Holland Publ. Amsterdam, NL, vol. 16, No. 9, Sep. 1, 1995, pp. 893-900, XP004062467 ISSN: 0167-8655 *abstract; figure 1*, *p. 893-p. 896*.

Mista T. et al., "Image Registration Using Elastic Contours and Internal Landmarks", Instrumentation and Measurement Technology Conference, 1998. IMTC/98. Conference Proceedings, IEEE St. Paul, MN, USA May 18-21, 1998, New York, NY, USA, IEEE, US May 18, 1998, pp. 451-455, XP010281628, ISBN: 0-7803-4797-8 *p. 451*.

Doermann D et al., "The Detection of Duplicates in Document Image Databases", Proceedings of the 4th International Conference on Document Analysis and Recognition, (ICDAR). ULM, Germany, Aug. 18-20, 1997, Proceedings of the ICDAR, Los Alamitos, IEEE Comp., Soc, US, vol. II, Aug. 18, 1997, pp. 314-318, XP010244732, IBSN: 0-8186-7898-4, p. 314, left hand column, paragraph 2—right hand column, paragraph 2*, *p. 316, right-hand column, paragraph9—p. 317, left-hand column, paragraph 1.

* cited by examiner

METHOD AND SYSTEM FOR DETECTING A GEOMETRICALLY TRANSFORMED COPY OF AN IMAGE

FIELD OF THE INVENTION

The invention relates generally to the field of digital image processing, and in particular, to detecting a geometrically transformed copy of an image.

BACKGROUND OF THE INVENTION

The number and size of digital image collections are growing rapidly in both the consumer and commercial domains. Sharing, sale, and other distribution of digital images often introduce images into a collection or database that are substantially similar to images already contained within the database. These similar images consume valuable storage resources and complicate the management of the collection without adding significant value to the collection. For commercial databases, the presence of redundant images adversely affects the salability of these assets. There exists a need to control this redundancy within image databases and collections by identifying redundant images and optionally purging them from the collection.

In addition, the relative ease of capturing and reusing images makes it difficult for the owners of image assets to detect unauthorized reuse of their images. Such owners can embed visually imperceptible digital watermarks within their image assets. The unauthorized reuse of portions of an asset within another image may make the extraction of information from the watermarked portions difficult. Identification of the copied portions of an image can improve the likelihood of recovery of the watermark. Thus, there exists a need to aid in the detection of such unauthorized reuse of all or part of their assets.

The detection of duplicate or substantially similar images can be performed using whole-image analysis. Examples of this are the methods employed by Jain, et al in U.S. Pat. No. 5,911,139 and Doermann in "The detection of duplicates in document image databases," *Proceedings of the International Conference on Document Analysis and Recognition,* 1997. Jain and Doermann extract depictive features from each image and use such features to control the insertion of images into an image database. These methods are applicable in the detection of copies that do not differ substantially from their original. They may fail to detect copies that reproduce only portions of the original image.

Fingerprint analysis also deals with the matching of images, but the goal is substantially different from finding duplicate images or image segments. In this domain, the question is not whether two images, or portions thereof, share a common pictorial origin, rather it is whether two distinct images have been made by the same finger. Indeed, typically it is known a priori that the two images are impressions having distinctly different origins.

Fingerprint analysis techniques must accommodate partial fingerprints, image distortion, and multiple orientations. In U.S. Pat. No. 6,094,507, Monden et al choose many points of interest within each fingerprint. They form pairs of similar points such that one point comes from each image. They then analyze the positional relationship between these pairs of points to build a hypothetical geometric transformation that best aligns these point pairs. Pairs that fail to conform to the transformation are discarded and the local features extracted near the remaining point pairs are used as a basis of comparison between the two fingerprints.

The search for correspondence points is made easier by a priori knowledge of the image domain. Fingerprints do not vary grossly in scale, and fingerprint matches are only attempted on images that contain a substantial portion of the fingerprint pattern. The final analysis of image similarity is based upon the local features surrounding each point of interest; no information is generated beyond the selected points.

Förstner discusses image matching in *Computer and Robot Vision Volume II*, R. Haralick and L. Shapiro, editors, Chapter 16.5, Addison Wesley, 1993. In this discussion, feature points in each image are selected and paired, and a spatial-mapping function is determined using a robust estimation method. As a final step, the results are evaluated over the accepted correspondence points.

Fingerprint matching and the methods discussed by Förstner address pairs of images in which points of interest are selected and paired based upon their local features without regard to any semantic significance they may have. Frequently, images contain a large number of points of interest in comparison with the number of objects in the images that have semantic significance. Because these algorithms do not rely on semantic objects in the images, they tend to require a larger amount of computational effort to robustly match two images than algorithms that rely on matching the smaller number of semantic objects. Furthermore, once the correspondence function has been determined, neither the fingerprint matching methods nor the methods discussed by Förstner attempt to delimit the region over which this relationship is valid. Thus, none of the methods discussed addresses the identification of images or portions of images that may have been copied or combined with other imagery to form a new image. Thus, a need exists to detect and identify portions of an image that may be a geometrically transformed portion of another image.

A geometrical transformation is a mapping function that establishes a spatial correspondence between points in an image and its transformed counterpart. Many different types of mapping functions are used in various areas of image processing. For example, image resizing can be thought of as a horizontal and vertical scaling of the original image to create an image with different pixel dimensions and apparent resolution. Image rotation is typically performed to compensate for slight rotational misalignment of the camera during image capture, or to store portrait (resp. landscape) images in landscape (resp. portrait) mode. Image translation is a horizontal and vertical translation of the image coordinates that is typically done to compensate for slight translational misalignment of the camera during image capture, or to center a region of interest in the image. Affine or perspective transformations are typically applied to an image in order to rectify edges or lines in the image that should be parallel, or predominantly directed in a certain direction. Bilinear, polynomial, local polynomial, and spline models are typically used to model more complicated phenomena in images, such as lens distortion or aberration. In some cases, the mapping function is not defined over the entire domain of the image, but rather only over a region of interest, such as in image cropping. In image cropping, a region of interest is chosen in the original image, and image data outside the region of interest is deleted. In many cases, geometrical transformations can be thought of as compositions of multiple mapping functions. For example, a typical imaging operation is to crop and resize an original image so that it is centered and "zoomed in" on an object of interest. For further general information on geometric transformations of images, see G. Wolberg, *Digital Image Warping*, IEEE Computer Society Press, 1990.

Images in a collection or database that are geometrically transformed versions of another image in the same collection or database add no information that is not already contained within the parent image. Thus, these geometrically transformed images may occupy significant storage space while adding no informational value.

An obvious automatic method for identifying an image that is a geometrically transformed version of another image would be to compare the contents of the two images at a variety of values of combinations of the parameters of the transformation. This solution is computationally intractable even in the simple case of image resizing because of the virtually infinite number of possible relative scale combinations for comparing the two images. Other types of geometric transformations require more degrees of freedom, so the computational requirement increases even further. Therefore, there exists a need in the art for a method to automatically and efficiently test two images to determine if portions of one are a geometrically transformed version of the other.

In addition, oftentimes images that are geometrically transformed are also subjected to minor color corrections. In these cases it may be desirable to detect the similar content relationship with tolerance to moderate color corrections.

SUMMARY OF THE INVENTION

An object of the invention is the detection of a geometrically transformed copy of content from one image in at least a portion of another image.

A further object of the invention is the identification of the spatial extent of similar regions of the two images.

The present invention is directed to overcoming one or more of the problems set forth above. The invention resides in a method for detecting a geometrically transformed copy of content in at least a portion of an image, comprising the steps of: (a) providing first and second digital images; (b) searching for objects of interest within each digital image; (c) identifying pairs of corresponding objects of interest in the digital images, wherein each pair of corresponding objects of interest comprises a located object of interest in the first digital image and a corresponding located object of interest in the second digital image that corresponds to the located object of interest in the first image; (d) locating feature points on each located object of interest in each digital image; (e) matching feature points on the located object of interest in the first digital image to the feature points on the corresponding object of interest in the second digital image, thereby generating a set of correspondence points for each image; (f) determining parameters of a geometric transformation that maps the set of correspondence points in the first digital image into the set of correspondence points in the second digital image; (g) transforming the first digital image according to the parameters of the geometric transformation determined in step (f); and (h) detecting regions of similarity between the content of the transformed first digital image and the second digital image, thereby determining if the second image contains a region that is a geometrically transformed copy of a region in the first image.

A further aspect of the invention is the identification of the spatial extent of similar regions of the two images. This identification is performed using a three-stage approach. First, correspondence points are identified by searching for objects of interest within each image, matching corresponding objects of interest, locating feature points on each object of interest, and matching feature points on matched objects of interest. Second, a geometric transformation relating the correspondence points is computed. Third, the spatial extent of similar regions of the two images is found by warping the first image according to the computed geometric transform, and then comparing the pixel code values of the warped first image with the original second image.

For commercial databases, the advantage of the invention lies in its ability to recognize and control redundancy within image databases and collections by identifying redundant images and optionally purging them from the collection. In addition, the ability to detect a geometrically transformed copy of content in a portion of an image allows the owners of image assets to detect unauthorized reuse of their images, and in particular where the unauthorized reuse only appears in the given portion of the image.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

In the following description, a preferred embodiment of the present invention will be described in terms that would ordinarily be implemented as a software program. Those skilled in the art will readily recognize that the equivalent of such software may also be constructed in hardware. Because image manipulation algorithms and systems are well known, the present description will be directed in particular to algorithms and systems forming part of, or cooperating more directly with, the system and method in accordance with the present invention. Other aspects of such algorithms and systems, and hardware and/or software for producing and otherwise processing the image signals involved therewith, not specifically shown or described herein, may be selected from such systems, algorithms, components and elements known in the art. Given the system as described according to the invention in the following materials, software not specifically shown, suggested or described herein that is useful for implementation of the invention is conventional and within the ordinary skill in such arts.

Still further, as used herein, the computer program may be stored in a computer readable storage medium, which may comprise, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

Before describing the present invention, it facilitates understanding to note that the present invention is preferably utilized on any well-known computer system, such as a personal computer. Consequently, the computer system will not be discussed in detail herein. It is also instructive to note that the images are either directly input into the computer system (for example by a digital camera) or digitized before input into the computer system (for example by scanning an original, such as a silver halide film).

Figure 1:
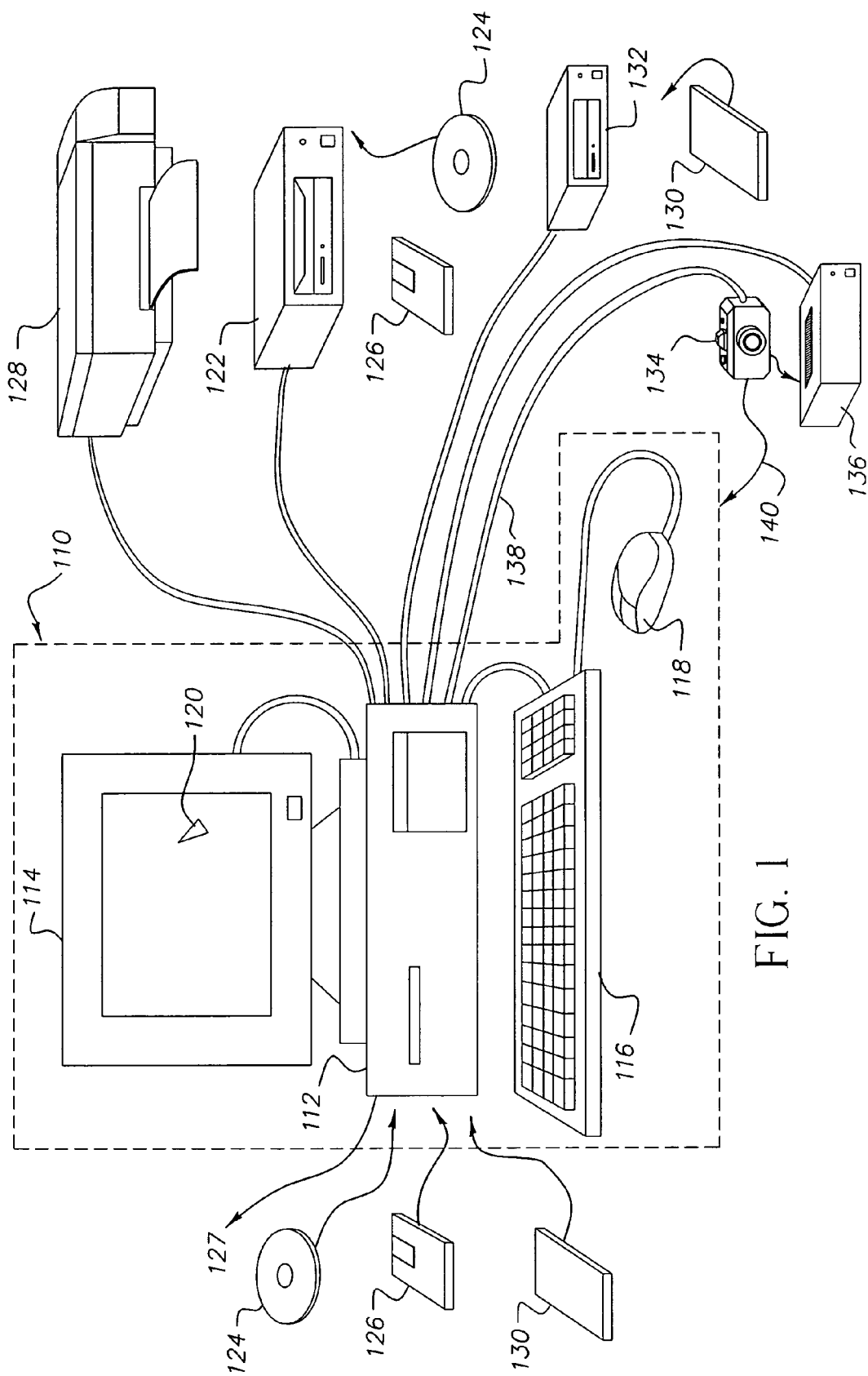
FIG. 1 is a perspective diagram of a computer system for implementing the present invention.

Referring to FIG. 1, there is illustrated a computer system 110 for implementing the present invention. Although the computer system 110 is shown for the purpose of illustrating a preferred embodiment, the present invention is not limited to the computer system 110 shown, but may be used on any electronic processing system such as found in home computers, kiosks, retail or wholesale photofinishing, or any other system for the processing of digital images. The computer system 110 includes a microprocessor-based unit 112 for receiving and processing software programs and for performing other processing functions. A display 114 is electrically connected to the microprocessor-based unit 112 for displaying user-related information associated with the software, e.g., by means of a graphical user interface. A keyboard 116 is also connected to the microprocessor based unit 112 for permitting a user to input information to the software. As an alternative to using the keyboard 116 for input, a mouse 118 may be used for moving a selector 120 on the display 114 and for selecting an item on which the selector 120 overlays, as is well known in the art.

A compact disk-read only memory (CD-ROM) 124, which typically includes software programs, is inserted into the microprocessor based unit for providing a means of inputting the software programs and other information to the microprocessor based unit 112. In addition, a floppy disk 126 may also include a software program, and is inserted into the microprocessor-based unit 112 for inputting the software program. The compact disk-read only memory (CD-ROM) 124 or the floppy disk 126 may alternatively be inserted into externally located disk drive unit 122 which is connected to the microprocessor-based unit 112. Still further, the microprocessor-based unit 112 may be programmed, as is well known in the art, for storing the software program internally. The microprocessor-based unit 112 may also have a network connection 127, such as a telephone line, to an external network, such as a local area network or the Internet. A printer 128 may also be connected to the microprocessor-based unit 112 for printing a hardcopy of the output from the computer system 110.

Images may also be displayed on the display 114 via a personal computer card (PC card) 130, such as, as it was formerly known, a PCMCIA card (based on the specifications of the Personal Computer Memory Card International Association) which contains digitized images electronically embodied in the card 130. The PC card 130 is ultimately inserted into the microprocessor based unit 112 for permitting visual display of the image on the display 114. Alternatively, the PC card 130 can be inserted into an externally located PC card reader 132 connected to the microprocessor-based unit 112. Images may also be input via the compact disk 124, the floppy disk 126, or the network connection 127. Any images stored in the PC card 130, the floppy disk 126 or the compact disk 124, or input through the network connection 127, may have been obtained from a variety of sources, such as a digital camera or a scanner (not shown). For example, images may be input directly from a digital camera 134 via a camera docking port 136 connected to the microprocessor-based unit 112 or directly from the digital camera 134 via a cable connection 138 to the microprocessor-based unit 112 or via a wireless connection 140 to the microprocessor-based unit 112.

In accordance with the invention, the algorithm may be stored in any of the storage devices heretofore mentioned and applied to images in order to detect an image that is a geometrically transformed version of another image.

Figure 2:
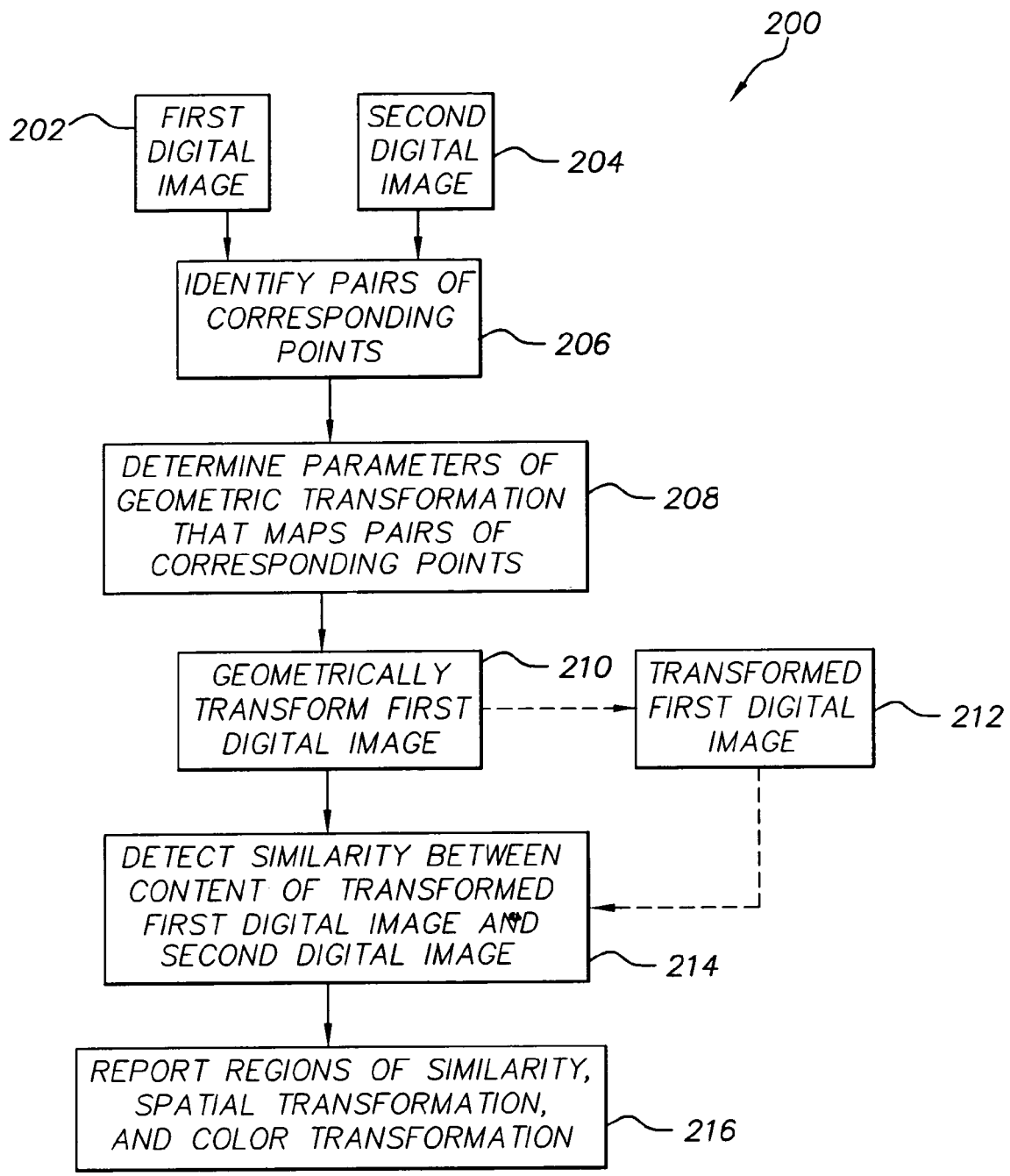
FIG. 2 is a flowchart illustrating the method of the present invention.

FIG. 2 illustrates the method of the present invention for detecting a geometrically transformed copy of an image. In the first step 200, two digital images are provided; a first digital image 202 and a second digital image 204. The digital images can be provided by a variety of means; for example, they can be captured from a digital camera, extracted from frames of a video sequence, scanned from hardcopy output, or generated by any other means. Next, pairs of corresponding points between the first digital image 202 and the second digital image 204 are identified (step 206). Corresponding points are defined to be pixel locations in the first digital image 202 and second digital image 204 that correspond to the same scene point. In some instances, the identification of corresponding points without any a priori knowledge of the image content can be difficult to perform robustly. A few algorithms have been developed to solve this problem, with limited success that decreases as the geometrical difference between the two images increases. For examples of such algorithms, see Zhang, Z., Deriche, R., Faugeras, O. and Luong, Q.-T., "A Robust Technique for Matching Two Uncalibrated Images Through the Recovery of the Unknown Epipolar Geometry", INRIA Research Report No. 2273, May, 1994, and Pilu, M., "A Direct Method for Stereo Correspondence Based on Singular Value Decomposition", Proc. CVPR, pp. 261–266, 1997. When a priori information exists, such as known locations of objects of interest in each image, this information can be used to simplify the process of identifying pairs of correspondence points. An example of an embodiment of this invention that uses a priori information is described in FIG. 3.

When pairs of corresponding points have been identified (step 206), the parameters of the geometric transformation mapping corresponding points from the first digital image 202 to corresponding points from the second digital image 204 are determined (step 208). Any of the aforementioned geometric transformations can be expressed with a certain number of parameters or degrees of freedom. For example, image resizing requires a scaling parameter. Image rotation requires an angular parameter describing the angle of rotation (assuming that the center of rotation is fixed, say, at the center of the image). Image translation requires two parameters describing the horizontal and vertical offsets of the translation. Affine transformations require six parameters, and perspective and bilinear transformations both require eight parameters. Polynomial, local polynomial, and spline transformations require an increasing number of parameters depending on the degree of the polynomial or spline, and the number of local polynomials or spline intervals used. If a geometric transformation between two images requires N parameters, those parameters can be estimated when at least $\lceil N/2 \rceil$ corresponding point pairs (in general position; e.g., at least 3 non-collinear corresponding point pairs for an affine transformation) have been identified. If exactly $\lceil N/2 \rceil$ corresponding point pairs in general position have been identified, the parameters of the geometric transformation can be computed exactly. If more than [N/2] corresponding point pairs in general position have been identified, the mapping is now overdetermined, so the parameters of the geometric transformation are estimated to be optimal in some sense. For example, the errors, or differences between corresponding points in the second digital image 204 and predicted correspondence points in the second digital image 204, are minimized in a norm such as the $l_2$ norm (see Bartle, R., *The Elements of Integration and Lebesgue Measure*, John Wiley & Sons, 1995, pp. 52–64). Alternatively, the median absolute error is minimized, or a maximum likelihood estimate is made in order to render the estimated parameters robust to an incorrectly identified corresponding point.

In step 210, the first digital image 202 is then transformed according to the geometric transformation with parameters determined in step 208 to form a transformed first digital image 212. All of the aforementioned geometric transformations, aside from cropping, can be applied to images in a two-stage process. First, the pixel locations of the image are transformed according to the geometric transformation. Then, the image values are interpolated at a regular grid of points to form the transformed image. Details on various interpolation techniques can be found in Gonzalez, R. and Woods, R., *Digital Image Processing*, Addison-Wesley, 1992.

Finally, in step 214, any similarity between the transformed first digital image 212 and the second digital image 204 is detected. The presence of a similarity indicates that at least a portion of one image is a geometrically transformed copy of the other image. One simple technique of detecting similarity is to subtract the transformed first digital image from the second digital image 204 to form a difference image. If the images are similar, the histogram of the difference image will exhibit a large clustering of values around zero. It may be necessary to compensate for color or luminance transformations applied to the copied portion of the image. If only portions of the images are common, then the difference image may yield a map indicating the spatial extent of the regions common to both images. The resulting similarity maps and the spatial and color transformations are reported (step 216). (For further information about differencing techniques, see the aforementioned Gonzalez and Woods reference, pp. 185–187).

Figure 3:
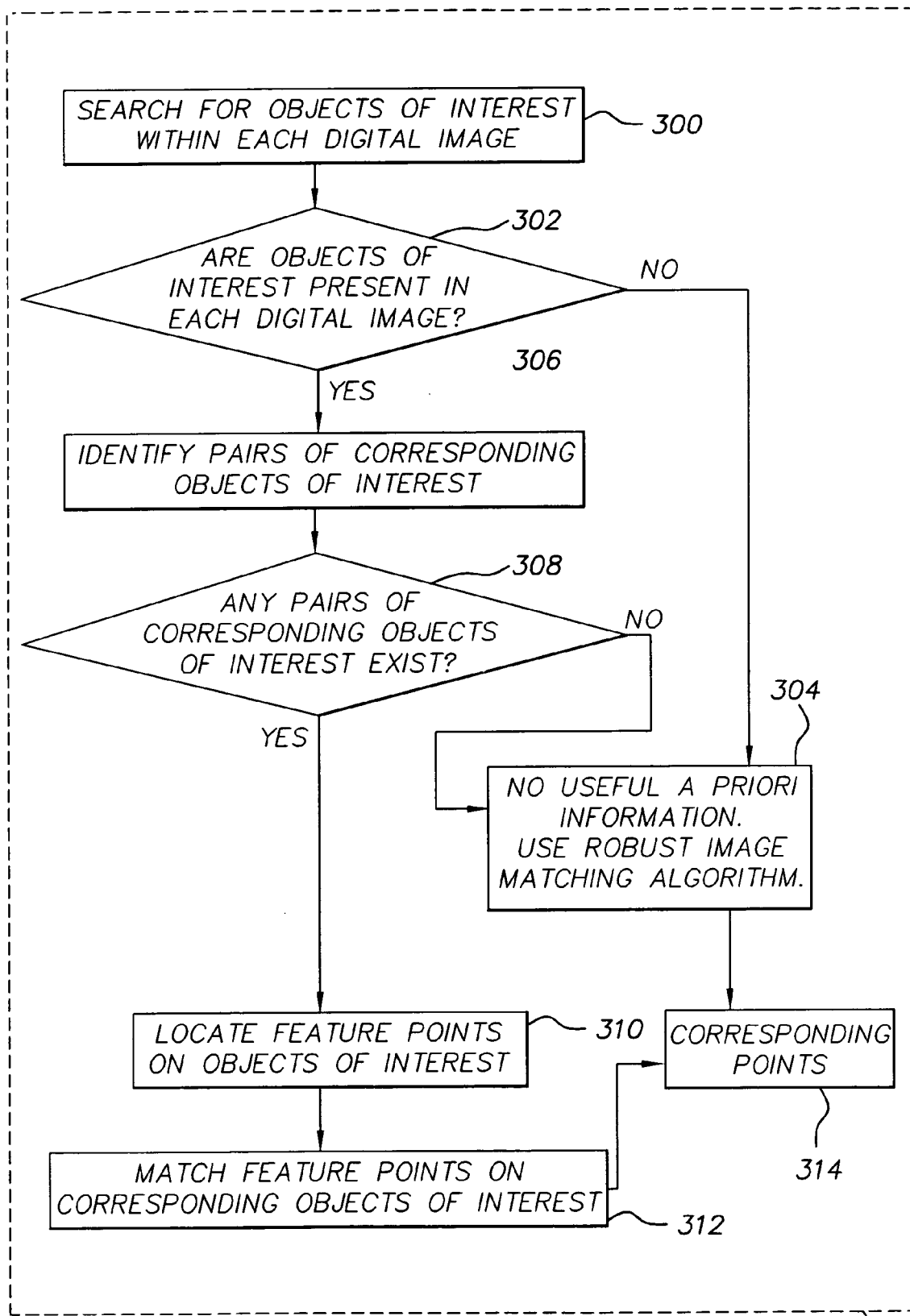
FIG. 3 is a flowchart illustrating an embodiment of one of the steps of the present invention.

FIG. 3 illustrates an embodiment of the step 206 of identifying pairs of corresponding points between the first digital image 202 and second digital image 204. First, each digital image is searched (step 300) for objects of interest. Examples of objects of interest include human faces, people, animals, architectural structures, structured patterns of pixel values that may not correspond to real-world objects, etc. The digital images can be searched by a variety of means. Pattern recognition techniques, such as multi-resolution template matching, neural networks, and Bayesian inferencing are a few of many digital image processing algorithms that can be used to search for objects of interest in images. In addition, if the locations of objects of interest have been found a priori by some manual or automatic technique, those locations can be stored as meta-data within the image files of each provided image 202 and 204. An example of a simple manual technique is when the user draws a circle or bounding box around each object of interest in each digital image, or annotates each image with a textual message describing the image content, placing the textual message in the meta-data of the digital image. If the locations of objects of interest are stored as meta-data within the image files of images 202 and 204, the step 300 only requires extracting the meta-data from the image files, and does not require further digital image processing.

Once the step 300 of searching for objects of interest has taken place, a query 302 is made as to whether each image contains any objects of interest. A negative response to query 302 indicates that there is no useful a priori information, and pairs of corresponding points are then identified by one of the aforementioned (Zhang et. al. or Pilu) robust image matching algorithms (step 304). An affirmative response to query 302 indicates that pairs of corresponding objects of interest should be identified (step 306). A pair of corresponding objects of interest is defined as a located object of interest in the first digital image 202 and a located object of interest in the second digital image 204 that correspond to the same object of interest in the scene. Corresponding objects of interest can be identified by a variety of techniques. Classification algorithms, such as K-nearest neighbors, neural networks, or support vector machines can be used to label objects of interest as belonging to one or more of a set of classes. (For a survey of classification algorithms, see Fukunaga, K, *Statistical Pattern Recognition*, $2^{nd}$ Ed., Academic Press, 1990.) An object of interest in one digital image can be said to be in correspondence with an object of interest in the other digital image if both objects belong to the same class. If more than one object of interest in one of the images belongs to the same class, correspondence can be determined, for instance, by comparing image values and choosing as the corresponding object of interest the one that is closest in terms of some image value metric. As an alternative to classification algorithms, objects of interest can be pre-classified and their classification stored in the meta-data of the image file. Consider the case where the object of interest is a human face, and the digital image is of two persons. Two human faces appear in the image, and they are classified as "first person" and "second person", respectively. The location of first person's (resp. second person's) face and the label "first person" (resp. "second person") is stored in the meta-data of the image.

Once the step 306 of identifying pairs of corresponding objects of interest has taken place, a query 308 is made as to whether any pairs of corresponding objects of interest have been identified. A negative response to query 308 indicates that there is no useful a priori information, and pairs of corresponding points are then identified by one of the aforementioned (Zhang et. al. or Pilu) robust image matching algorithms (step 304). An affirmative response to query 308 indicates that feature points should be located (step 310) on each object of interest. Examples of feature points include corners, bifurcation points, points with certain image values, and points representing known structures on the object of interest. Feature points can be detected through a variety of digital image processing techniques, or they can be found or labeled a priori, and their locations stored in the meta-data of the image files of the first and second digital images.

When the feature points on objects of interest have been located (step 310), they are matched (step 312) to feature points on the corresponding object of interest in the other digital image. This can be done by one of the aforementioned pattern recognition techniques. Alternatively, the feature points can be labeled or classified, and they can be matched with similarly labeled or classified feature points in the corresponding object of interest in the other digital image. For example, if the object of interest is a human face, feature points might be labeled "right eye center", "bridge of nose", etc. Once the feature points have been matched for all corresponding objects of interest, the resulting set of matched points forms the set of pairs of corresponding points 314.

In the preferred embodiment, the objects of interest are human faces. There exist many algorithms available on the prior art for detecting and recognizing faces in images. For good survey papers on face detection and recognition, see Yang, M.-H., Kriegman, D., and Ahuja, N., "Detecting Faces in Images: A Survey", IEEE Trans. Pattern Analysis and Machine Intelligence, Vol. 24, No. 1, pp. 34–58, 2002, and Zhao, W., Chellappa, R., Rosenfeld, A., and Phillips, P. "Face Recognition: A Literature Survey", UMD CfAR Technical Report CAR-TR-948, 2000. Face detection algorithms can be used to execute step 300, and face recognition can be used to classify faces as part of step 306. The individual faces may be identified through a face recognition system such as the FaceIt system by Visionics Corporation; faces with similar identification are paired. Alternately, pairing may be accomplished by finding faces having the highest similarity. The similarity between faces also may be calculated using various methods such as the one described by Turk and Pentland in "Eigenfaces for recognition," Journal of Cognitive Neuroscience, 3(1), 1991, or by finding the highest correlation between facial feature points after correcting for differences in scale, rotation, and translation using the same methods described hereinbelow. Faces have many recognizable feature points, such as the locations of the eyes, nose, mouth, and other distinctive features. Facial feature points can be obtained by using a method such as the one described by Bolin, M. and Chen, S., "An Automatic Facial Feature Finding System for Portrait Images," Proceedings of the 55$^{th}$ Annual Conference of the Society for Imaging Science and Technology (PICTS 2002).

Figure 4A:
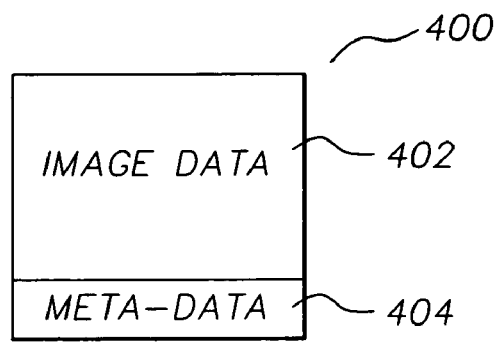
FIG. 4A is a diagram of an image file containing image data and meta-data.

Referring now to FIG. 4A, each digital image that is provided in step 200 is stored in a digital image file 400, which contains both image data 402 and meta-data 404. Meta-data 404 is defined as ancillary data relevant to the image (data other than the image data 402 itself). For example, locations of objects of interest in the image can be identified a priori, by an automatic digital image processing technique, or by manual labeling, and these locations can be stored in the meta-data 404 of the image file 400. As another example, a classification of each object of interest can be stored in the meta-data. It is possible to merely append such meta-data to the image data in the image file. Some file formats such as TIFF provide segments for user-defined information. Alternatively, meta-data can be embedded within the image data itself in order to allow the use of a wider variety of standard file formats, and to provide some level of security in that the meta-data can only be recovered with some knowledge of the embedding process (such as a "key" value).

Figure 4B:
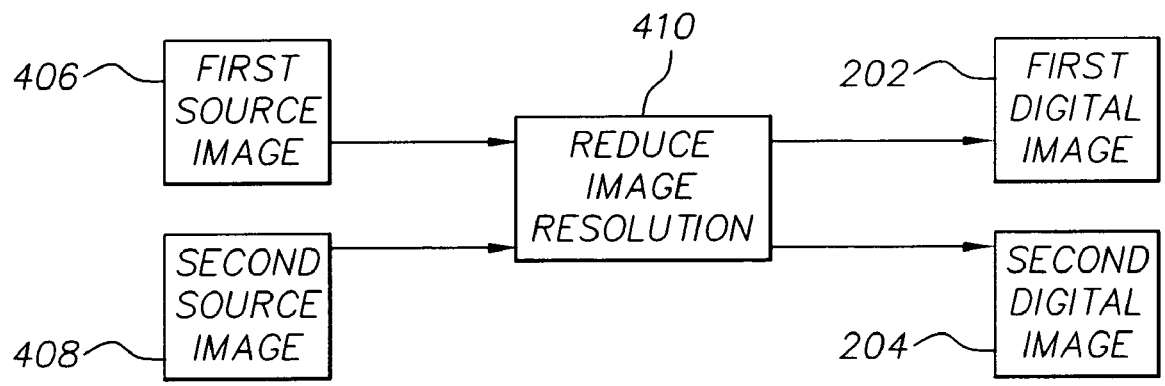
FIG. 4B is a flowchart illustrating an embodiment of one of the steps of the present invention.

Referring now to FIG. 4B, the step 200 of providing first 202 and second 204 digital images involves providing first 406 and second 408 source images, and reducing 410 the resolution of each source image to yield first 202 and second 204 digital images. The step 410 of reducing the resolution of each source image allows an increase in computational speed of the subsequent steps of geometrically transforming 210 the first digital image and detecting 214 the similarity between the content of the transformed first digital image 212 and the second digital image 204. Since the steps 210 and 214 involve operations on every pixel in the first 202 and second 204 digital images, providing (in step 200) first 202 and second 204 digital images of reduced resolution decreases the number of pixels, thereby reducing the number of operations required. A variety of techniques in the art can be applied to reduce the resolution of the first 202 and second 204 digital images (see the aforementioned Gonzalez reference).

Figure 5A:
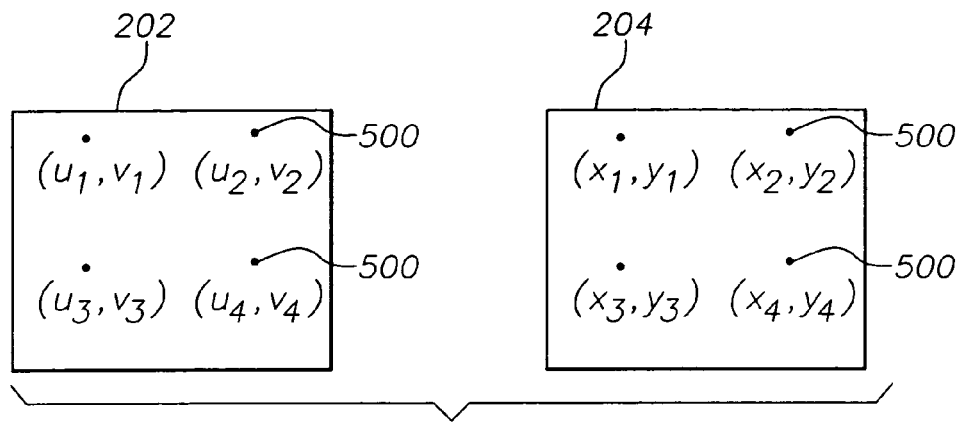
FIG. 5A is a diagram illustrating a set of pairs of corresponding points.
Figure 5B:
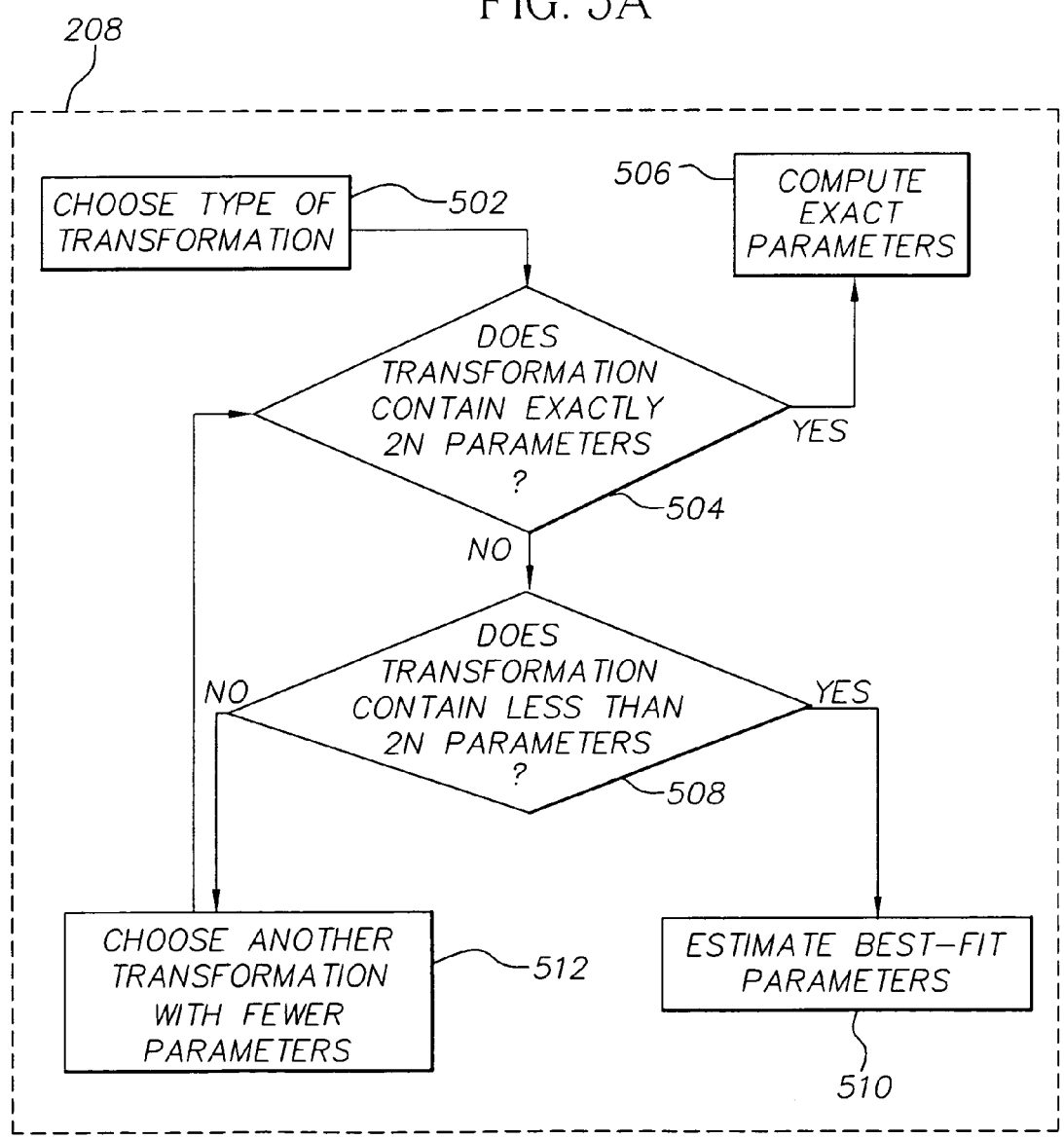
FIG. 5B is a flowchart illustrating a process for determining parameters of a geometric transformation.

Referring now to FIGS. 5A and 5B, pairs of corresponding points 500 in the first digital image 202 are labeled $(u_i,v_i)$, i=1, ..., N and in the second digital image 204 are labeled $(x_i,y_i)$, i=1, ..., N, where N is the total number of pairs of corresponding points. An embodiment of the step 208 of determining parameters of the geometric transformation that maps pairs of corresponding points is shown in FIG. 5B. In step 502, a specific type of transformation that maps pairs of corresponding points is chosen. In the preferred embodiment, the chosen transformation is an affine transformation. Mathematically, an affine transformation can be described as a 2×3 matrix A with (j,k) entry $a_{jk}$ relating the corresponding points in the following manner:

$$\begin{pmatrix} x_i \\ y_i \end{pmatrix} = \begin{pmatrix} a_{11} & a_{12} & a_{13} \\ a_{21} & a_{22} & a_{23} \end{pmatrix} \begin{pmatrix} u_i \\ v_i \\ 1 \end{pmatrix}.$$

A query 504 is made as to whether the chosen transformation contains exactly 2N parameters. In the preferred embodiment, where the chosen transformation is an affine transformation, the only value of N for which query 504 merits an affirmative response is N=3. In this case, the affine transformation is computed directly (step 506) in the following way:

$$A = \begin{pmatrix} x_1 & x_2 & x_3 \\ y_1 & y_2 & y_3 \end{pmatrix} \begin{pmatrix} u_1 & u_2 & u_3 \\ v_1 & v_2 & v_3 \\ 1 & 1 & 1 \end{pmatrix}^{-1}.$$

In practice, directly computing a matrix inverse is not the most numerically stable procedure, so any other numerical linear algebra technique can be used, such as Gaussian Elimination with partial column pivoting, QR factorization, etc. (For a survey of numerical linear algebra techniques, see Stewart, G., "Matrix Algorithms Volume 1: Basic Decompositions," SIAM, 1998). In addition, it would behoove the user to normalize the pixel values in each image in order to avoid matrices with large condition numbers. An appropriate normalization scheme would be to set the origin at the center of the image, and scale the pixel locations so that the average correspondence point has unit distance from the origin.

If the response to query 504 is negative, a query 508 is made as to whether the transformation contains fewer than 2N parameters. In the preferred embodiment, where the chosen transformation is an affine transformation, query 504 merits a negative response whenever N>3. In this case, there is no affine transformation that maps the correspondence points exactly. Therefore, a "best-fit" transformation is obtained (i.e., a transformation that minimizes the errors between each correspondence point in the second image and its prediction through the affine transformation), as indicated by step 510. Typically, errors are minimized with respect to the aforementioned $l_2$ norm, but they can be minimized with respect to any norm, or a robust procedure such as least median of squares, maximum likelihood, etc. Defining:

$$B = \begin{pmatrix} x_1 & x_2 & \cdots & x_N \\ y_1 & y_2 & \cdots & y_N \end{pmatrix} \text{ and } C = \begin{pmatrix} u_1 & u_2 & \cdots & u_N \\ v_1 & v_2 & \cdots & v_N \\ 1 & 1 & \cdots & 1 \end{pmatrix},$$

the best-fit affine transformation can be computed by decomposing C according to its singular value decomposition $C=U\Sigma V^T$, and then computing $A=B\hat{V}\hat{\Sigma}^{-1}U^T$, where $\hat{\Sigma}$ is the left 3×3 sub-matrix of $\Sigma$, and $\hat{V}$ is the left N×3 sub-matrix of V. Details on the singular value decomposition can be found in the aforementioned Stewart reference. Those skilled in the art will realize there are a variety of other techniques for determining the best-fit affine transformation in the $l_2$ norm, such as QR decomposition, solution via linear least squares (for a survey of methods for solving least square problems see Lawson, C., and Hanson, R., "Solving Least Squares Problems," SIAM, 1995), etc.

If the response to query 508 is negative, then another transformation is chosen in step 512 that has fewer parameters than the current transformation, and the process is repeated using the new transformation, starting with query 504. Even though an affine transformation is preferred, other transformations can be used without deviating from the spirit or scope of this invention. Other transformations may be preferred in situations where there is some knowledge about the geometric relationship between the two images, or in situations where computational efficiency is a priority.

In another embodiment, the geometric transformation that maps pairs of corresponding points is image resizing by a single scalar parameter in the horizontal and vertical directions. Mathematically, if pixel coordinates are normalized so that the origin is at the center of the image, image resizing can be described as a scalar multiple a relating the corresponding points in the following manner:

$$\begin{pmatrix} x_i \\ y_i \end{pmatrix} = a \begin{pmatrix} u_i \\ v_i \end{pmatrix}.$$

If there are N pairs of corresponding points, a best-fit value of a can be obtained in the following manner. Defining:

$$B = (x_1\ y_1\ x_2\ y_2\ \ldots\ x_N\ y_N)^T \text{ and } C = (u_1\ v_1\ u_2\ v_2\ \ldots\ u_N v_N)^T,$$

the best-fit value of a is given by $a=(B^TB)/(B^TC)$.

In another embodiment, the geometric transformation that maps pairs of corresponding points is image resizing by different scalar parameters in the horizontal and vertical directions. Mathematically, if pixel coordinates are normalized so that the origin is at the center of the image, image resizing in two directions can be described by a vector $A=(a_1,a_2)$ relating the corresponding points in the following manner:

$$\begin{pmatrix} x_i \\ y_i \end{pmatrix} = \begin{pmatrix} a_1 & a_2 \end{pmatrix} \begin{pmatrix} u_i \\ v_i \end{pmatrix}.$$

If there is only one pair of corresponding points, and neither $u_1$ nor $v_1$ is zero, the scale parameters can be computed exactly: $a_1=x_1/u_1$ and $a_2=y_1/v_1$. If there are N pairs of corresponding points, a best-fit value of A can be obtained in the following manner. Defining:

$$B = \begin{pmatrix} x_1 & x_2 & \cdots & x_N \\ y_1 & y_2 & \cdots & y_N \end{pmatrix} \text{ and } C = \begin{pmatrix} u_1 & u_2 & \cdots & u_N \\ v_1 & v_2 & \cdots & v_N \end{pmatrix},$$

the best-fit value of A can be computed by decomposing C according to its singular value decomposition $C=U\Sigma V^T$, and then computing $A=B\hat{V}\hat{\Sigma}^{-1}U^T$, where $\hat{\Sigma}$ is the left 2×2 sub-matrix of $\Sigma$, and $\hat{V}$ is the left N×2 sub-matrix of V.

In another embodiment, the geometric transformation that maps pairs of corresponding points is a rotation of the image about the origin. Mathematically, if pixel coordinates are normalized so that the origin is at the center of the image, image rotation can be described by a clockwise angular parameter θ relating the corresponding points in the following manner:

$$\begin{pmatrix} x_i \\ y_i \end{pmatrix} = \begin{pmatrix} \cos\theta & \sin\theta \\ -\sin\theta & \cos\theta \end{pmatrix} \begin{pmatrix} u_i \\ v_i \end{pmatrix}.$$

If there are N pairs of correspondence points, a best-fit value of A can be obtained in the following manner. Transform $(x_i,y_i)$ and $(u_i,v_i)$ into polar form: $(r_i,\alpha_i)$ and $(p_i,\beta_i)$, respectively (where $x_i=r_i\cos\alpha_i$, $y_i=r_i\sin\alpha_i$, $u_1=p_1\cos\beta_1$, and $v_i=p_i\sin\beta_i$). Then, the best-fit value of θ is given by $$\theta = \frac{1}{N}\sum_{i=1}^{N}(\alpha_i - \beta_i).$$

Alternatively, the best-fit value of θ can be estimated by a non-linear least squares minimization. For examples of typical non-linear optimization techniques, see Fletcher, R., "Practical Methods of Optimization," $2^{nd}$ Edition, John Wiley & Sons, 1987.

In another embodiment, the geometric transformation that maps pairs of corresponding points is a translation in the horizontal and vertical directions of the image. Mathematically, if pixel coordinates are normalized so that the origin is at the center of the image, translation in two directions can be described by a vector $A=(a_1,a_2)^T$ relating the corresponding points in the following manner:

$$\begin{pmatrix} x_i \\ y_i \end{pmatrix} = \begin{pmatrix} u_i \\ v_i \end{pmatrix} + \begin{pmatrix} a_1 \\ a_2 \end{pmatrix}.$$

If there are N pairs of correspondence points, a best-fit value of A is given by $$A = \left(\frac{1}{N}\sum_{i=1}^{N}(x_i - u_i), \frac{1}{N}\sum_{i=1}^{N}(y_i - v_i)\right)^T.$$

In another embodiment, the geometric transformation that maps pairs of corresponding points is a shearing in the horizontal and vertical directions. Mathematically, if pixel coordinates are normalized so that the origin is at the center of the image, image shearing in two directions can be described by a vector $A=(a_1,a_2)$ relating the corresponding points in the following manner:

$$\begin{pmatrix} x_i \\ y_i \end{pmatrix} = \begin{pmatrix} 1 & a_1 \\ a_2 & 1 \end{pmatrix} \begin{pmatrix} u_i \\ v_i \end{pmatrix}.$$

If there is only one pair of corresponding points, and neither $u_1$ nor $v_1$ is zero, the shear parameters can be computed exactly: $a_1=(x_1-u_1)/v_1$ and $a_2=(y_1-v_1)/u_1$. If there are N pairs of corresponding points, a best-fit value of A can be obtained in the following manner. Defining:

$$B = \begin{pmatrix} x_1-u_1 & x_2-u_2 & \cdots & x_N-u_N \\ y_1-v_1 & y_2-v_2 & \cdots & y_N-v_N \end{pmatrix} \text{ and } C = \begin{pmatrix} v_1 & v_2 & \cdots & v_N \\ u_1 & u_2 & \cdots & u_N \end{pmatrix},$$

the best-fit value of A can be computed by decomposing C according to its singular value decomposition $C=U\Sigma V^T$, and then computing $A=B\hat{V}\hat{\Sigma}^{-1}U^T$, where $\hat{\Sigma}$ is the left 2×2 sub-matrix of $\Sigma$, and $\hat{\Sigma}$ is the left N×2 sub-matrix of V.

Anyone of ordinary skill in the art will realize that compositions of any of these embodiments are not beyond the scope of this invention. For example, if the geometric transformation that maps pairs of corresponding points is a composition of rotation, translation, and image resizing, that transformation can be represented mathematically by:

$$\begin{pmatrix} x_i \\ y_i \end{pmatrix} = \begin{pmatrix} a_1 \cos\theta & \sin\theta & a_3 \\ -\sin\theta & a_2 \cos\theta & a_4 \end{pmatrix} \begin{pmatrix} u_i \\ v_i \\ 1 \end{pmatrix},$$

the best-fit set of parameters can be solved by a non-linear optimization routine according to the aforementioned Fletcher reference.

In another embodiment, the geometric transformation that maps pairs of corresponding points is a perspective transformation. Mathematically, a perspective transformation can be described by a matrix A relating the corresponding points in the following manner:

$$\begin{pmatrix} x_i w_i \\ y_i w_i \\ w_i \end{pmatrix} = \begin{pmatrix} a_{11} & a_{12} & a_{13} \\ a_{21} & a_{22} & a_{23} \\ a_{31} & a_{32} & a_{33} \end{pmatrix} \begin{pmatrix} u_i \\ v_i \\ 1 \end{pmatrix}.$$

The variables $w_i$ are actually dummy variables; a perspective transformation can be thought of alternatively as a rational linear function:

$$x_i = \frac{a_{11}u_i + a_{12}v_i + a_{13}}{a_{31}u_i + a_{32}v_i + a_{33}}, \quad y_i = \frac{a_{21}u_i + a_{22}v_i + a_{23}}{a_{31}u_i + a_{32}v_i + a_{33}}.$$

The optimal set of parameters of a perspective transformation can be solved by a non-linear optimization routine according to the aforementioned Fletcher reference.

In other embodiments, the geometric transformation that maps pairs of corresponding points is a higher-order transformation, such as a polynomial, local polynomial, or spline transformation. These transformations are all described in the aforementioned Wolberg reference, and their optimal parameters can be found through a variety of optimization techniques.

Figure 6:
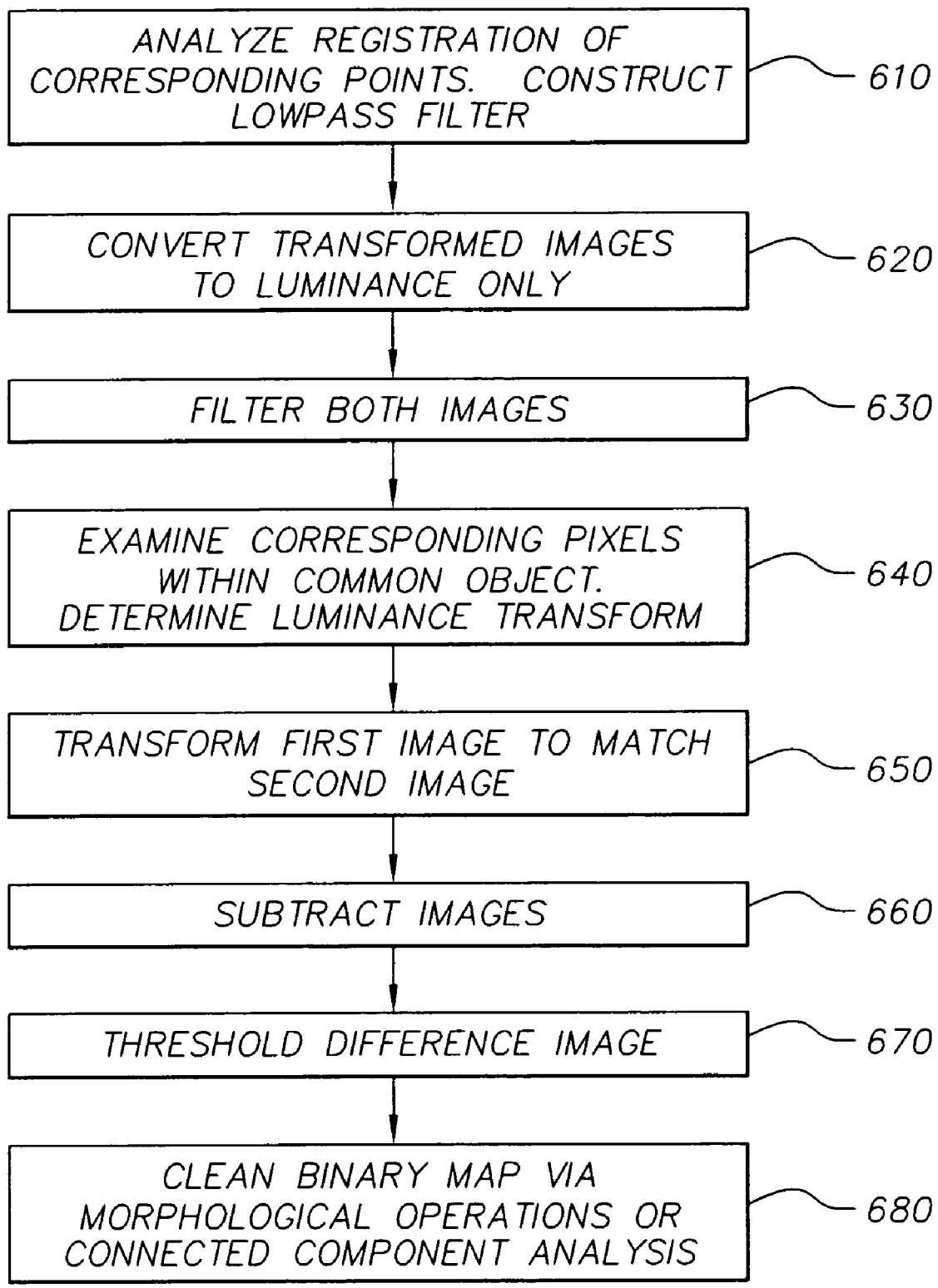
FIG. 6 is a flowchart illustrating a process for detecting regions of similarity between transformed images.

FIG. 6 illustrates an embodiment for detecting regions of similarity between the transformed first image and the second image. The transformation determined in step 208 may have some degree of inaccuracy due to errors in the location of correspondence points, or due to the failure of some points to fit the transformation model. This inaccuracy may lead to a slight misregistration between the two images that may degrade the performance of subsequent operations. In order to accommodate such error in the image matching process, a lowpass filter can be designed to mitigate anticipated misregistration by measuring the difference between correspondence points after transformation. In the preferred embodiment a Gaussian blur kernel is constructed (step 610). The degree of blur and the size of the kernel are proportional to the error between the corresponding points after transformation. The images are transformed into a luminance only representation (step 620), and each image is convolved with the constructed kernel (step 630).

The contrast and brightness of an image are often modified in the reuse of images; therefore these changes must be accommodated when comparing images. The pixels comprising the corresponding objects of interest are spatially correlated through the transformation and lowpass filtering operation. This spatial correlation is used to determine the luminance transformation between the two images (step 640). Corresponding pixel values can be used to create a linear transformation that adjusts the brightness and contrast of the images. This can be solved using linear regression or the methods mentioned above.

$$v_i = \begin{pmatrix} a_1 & a_2 \end{pmatrix} \begin{pmatrix} u_i \\ 1 \end{pmatrix}.$$

More complex models may be created to accommodate gamma correction, but dynamic range clipping in these transformations may complicate the solution. An alternative is to simply build a look up table that maps pixel values between the corresponding objects of the two pixels. Interpolation and extrapolation techniques can be employed to determine correspondences not populated within the look up table. The determined luminance transformation is applied to the first image (step 650), and a difference image is created by subtracting the images (step 660). Applying a threshold to the absolute value of the difference image creates a binary map of similar pixels (step 670). This map can be cleaned up and simplified by applying morphological operations, or by region merging and filling via connected component analysis (step 680). The resulting map describes the regions of similarity between the two images. Details on various morphological operations and connected component techniques can be found in Gonzalez, R. and Woods, R., "Digital Image Processing," Addison-Wesley, 1992, pages 518–548.

The preceding description of detecting regions of similarity is made with reference to operations on the luminance channel of the images. Those skilled in the art will recognize that analogous operations can be made to the full color representations of the images without departing from the scope of the present invention.

If the invention is considered to be a system, then the processing steps seen in FIG. 2 can be seen as separate processing stages. Basically, the invention provides a system for detecting if a second image contains at least a region thereof that is a geometrically transformed copy of a region in a first image. Referring to FIG. 2, a first processing stage 206 identifies pairs of corresponding points between the two images by searching for objects of interest within each digital image; identifying pairs of corresponding objects of interest in the digital images, wherein each pair of corresponding objects of interest comprises a located object of interest in the first digital image and a corresponding located object of interest in the second digital image that corresponds to the located object of interest in the first image; locating feature points on each located object of interest in each digital image; and matching feature points on the located object of interest in the first digital image to the feature points on the corresponding object of interest in the second digital image, thereby generating a set of correspondence points for each image. A second processing stage 208 determines parameters of a geometric transformation that maps the set of correspondence points in the first digital image into the set of correspondence points in the second digital image. A third processing stage 210 transforms the first digital image according to the parameters of the geometric transformation determined in stage 208, and a fourth processing stage 214 detects regions of similarity between the content of the transformed first digital image and the second digital image, thereby determining if the second image contains a region that is a geometrically transformed copy of a region in the first image. In addition, a fifth processing stage 216 reports a spatial extent of the content of the transformed first digital image found to be substantially similar to the content of the second digital image. Each processing stage is implemented by means of computer code that is executed by the microprocessor-based unit 112 shown in FIG. 1.

The invention has been described in detail with particular reference to certain preferred embodiments thereof, but it will be understood that variations and modifications can be effected within the spirit and scope of the invention.

PARTS LIST

110 Computer System
112 Microprocessor-based Unit
114 Display
116 Keyboard
118 Mouse
120 Selector on Display
122 Disk Drive Unit
124 Compact Disk—read Only Memory (CD-ROM)
126 Floppy Disk
127 Network Connection
128 Printer
130 Personal Computer Card (PC card)
132 PC Card Reader
134 Digital Camera
136 Camera Docking Port
138 Cable Connection
140 Wireless Connection
200 Providing Step
202 First Digital Image
204 Second Digital Image
206 Identifying Step
208 Determining Step
210 Geometrical Transformation Step
212 Transformed First Digital Image
214 Detect Similarity Step
216 Reporting step
300 Locate Step
302 Query
304 Image Matching Step
306 Identifying Step
308 Query
310 Location Step
312 Matching Step
314 Corresponding Points
400 Image File
402 Image Data
404 Meta-Data
406 First Source Image
408 Second Source Image
410 Reduction Step
500 Corresponding Points
502 Choose transformation step
504 Query
506 Compute exact parameters step
508 Query
510 Estimate best-fit parameters step
512 Choose another transformation step
610 Analyze registration step
620 Convert step
630 Filter step
640 Examine pixels step
650 Transform step
660 Subtract step
670 Threshold step
680 Clean binary map step

What is claimed is:

1. A method for detecting a geometrically transformed copy of content in at least a portion of an image, said method comprising the steps of:

providing first and second digital images;

locating one or more objects of interest within each said digital image;

identifying pairs of corresponding said objects of interest in the digital images, wherein each pair of corresponding objects of interest comprises a located object of interest in the first digital image and a corresponding located object of interest in the second digital image that corresponds to the located object of interest in the first image;

locating feature points on each located object of interest in each digital image;

matching feature points on the located object of interest in the first digital image to the feature points on the corresponding object of interest in the second digital image, thereby generating a set of correspondence points for each image;

choosing one of a predetermined plurality of geometric transformations to provide a chosen tranformation, said transformations having different numbers of parameters, said choosing being based on relative numbers of said parameters in respective said transformations and said correspondence points in said set;

determining parameters of said chosen transformation that relate the set of correspondence points in the first digital image into the set of correspondence points in the second digital image;

transforming the first digital image according to the parameters of the determined geometric transformation; and detecting regions of similarity between the content of the transformed first digital image and the second digital image, thereby determining if the second image contains a region that is a geometrically transformed copy of a region in the first image.

2. The method of claim 1 wherein the region comprises substantially all of each image.

3. The method of claim 1 wherein the region comprises a portion of each image.

4. The method of claim 1 further comprising the step of reporting a spatial extent of the content of the transformed first digital image found to be substantially similar to the content of the second digital image.

5. The method of claim 1 in which the two digital images contain locations of objects of interest within each digital image as meta-data.

6. The method of claim 1 in which the step of providing two digital images includes reducing the resolution of two source digital images.

7. The method of claim 1 in which the objects of interest are human faces.

8. The method of claim 1 in which each digital image contains as meta-data a classification of each object of interest in the digital image.

9. The method as in claim 1 in which the geometric transformation includes cropping.

10. The method as in claim 1 in which the geometric transformation includes resizing.

11. The method as in claim 1 in which the geometric transformation includes rotation.

12. The method as in claim 1 in which the geometric transformation includes translation.

13. The method as in claim 1 in which the geometric transformation includes shearing.

14. The method as in claim 1 in which the geometric transformation includes an affine transformation.

15. The method as in claim 1 in which the geometric transformation includes a perspective transformation.

16. The method as in claim 1 in which the geometric transformation includes a bilinear transformation.

17. The method as in claim 1 in which the geometric transformation includes a polynomial transformation.

18. The method as in claim 1 in which the geometric transformation includes a local polynomial transformation.

19. The method as in claim 1 in which the geometric transformation includes a spline transformation.

20. The method of claim 1 wherein said number of parameters in said chosen transformation exactly equal the number of said correspondence points and determined parameters map the set of correspondence points in the first digital image into the set of correspondence points in the second digital image.

21. The method of claim 1 wherein said objects of interest are one or more of: human faces, people, animals, and architectural structures.

22. The method of claim 1 further comprising the step of filtering the transformed first digital image and the second digital image with a blur filter prior to said detecting.

23. The method of claim 1 wherein said filtering step further comprises constructing the blur filter responsive to the transforming using a plurality of the corresponding points.

24. The method of claim 1 wherein said locating further comprises locating one or more objects of interest in the first digital image, and, independently, locating one or more objects of interest in the second digital image.

25. A system for detecting if a second image contains at least a region thereof that is a geometrically transformed copy of a region in a first image, said system comprising:

(a) a first processing stage searching for objects of interest within each digital image independent of the other digital image; identifying pairs of corresponding said objects of interest in the digital images, wherein each pair of corresponding objects of interest comprises a located object of interest in the first digital image and a corresponding located object of interest in the second digital image that corresponds to the located object of interest in the first image; locating feature points on each located object of interest in each digital image; and matching feature points on the located object of interest in the first digital image to the feature points on the corresponding object of interest in the second digital image, thereby generating a set of correspondence points for each image;

(b) a second processing stage choosing a geometric transformation from a predetermined plurality of transformations having different numbers of parameters, and determining parameters of the chosen transformation that maps the set of correspondence points in the first digital image into the set of correspondence points in the second digital image;

(c) a third processing stage transforming the first digital image according to the parameters of the geometric transformation determined in the second processing stage; and (d) a fourth processing stage detecting regions of similarity between the content of the transformed first digital image and the second digital image, thereby determining if the second image contains a region that is a geometrically transformed copy of a region in the first image.

26. The system of claim 25 wherein the region comprises substantially all of each image.

27. The system of claim 25 wherein the region comprises a portion of each image.

28. The system of claim 25, further comprising a fifth processing stage reporting a spatial extent of the content of the transformed first digital image found to be substantially similar to the content of the second digital image.

29. The system of claim 25, in which the two digital images contain locations of objects of interest within each digital image as meta-data.

30. The system of claim 25, in which the two digital images are reduced resolution versions of two source digital images.

31. The system of claim 25, in which the objects of interest are human faces.

32. The system of claim 25, in which each digital image contains as meta-data a classification of each object of interest in the digital image.

33. The system of claim 25, in which the geometric transformation includes cropping.

34. The system of claim 25, in which the geometric transformation includes resizing.

35. The system of claim 25, in which the geometric transformation includes rotation.

36. The system of claim 25, in which the geometric transformation includes translation.

37. The system of claim 25, in which the geometric transformation includes shearing.

38. The system of claim 25, in which the geometric transformation includes an affine transformation.

39. The system of claim 25, in which the geometric transformation includes a perspective transformation.

40. The system of claim 25, in which the geometric transformation includes a bilinear transformation.

41. The system of claim 25, in which the geometric transformation includes a polynomial transformation.

42. The system of claim 25, in which the geometric transformation includes a local polynomial transformation.

43. The system of claim 25, in which the geometric transformation includes a spline transformation.

44. A method for detecting a geometrically transformed copy of content in at least a portion of an image, said method comprising the steps of:
locating one or more objects of interest in a first digital image, and, independently, locating one or more objects of interest in a second digital image;
identifying one or more object of interest pairs, each said pair having corresponding said objects of interest in said first and second digital images;
locating feature points on each said object of interest in each said digital image;
matching feature points of respective said objects of interest in each of said object of interest pairs to generate a set of correspondence points in each said digital image;
choosing one of a predetermined plurality of geometric transformations to provide a chosen tranformation, said transformations having different numbers of parameters, said choosing being based on relative numbers of said parameters in respective said transformations and said correspondence points in each of said sets;
determining parameters of the chosen said geometric transformation that map said set of correspondence points in said first digital image into said set of correspondence points in said second digital image;
transforming said first digital image according to said geometric transformation having said determined parameters; and
detecting similarity between the content of said transformed first digital image and said second digital image.

45. A method for detecting a geometrically transformed copy of content in at least a portion of an image, said method comprising the steps of:
providing first and second digital image files, said digital image files including first and second digital images, respectively, each said digital image file including meta-data additional to the respective said digital image, said meta-data of each said digital image file indicating one or both of: a location and a classification of each of one or more objects of interest in the respective said digital image;
identifying one or more object of interest pairs using said meta-data, each said pair having corresponding said objects of interest in the first and second digital images;
locating feature points on each said object of interest in each said digital image;
matching feature points of respective said objects of interest in each of said object of interest pairs to generate a set of correspondence points in each said digital image;
choosing one of a predetermined plurality of geometric transformations to provide a chosen tranformation, said transformations having different numbers of parameters, said choosing being based on relative numbers of said parameters in respective said transformations and said correspondence points in said set;
determining parameters of said chosen transformation that relates said set of correspondence points in said first digital image into said set of correspondence points in said second digital image;
transforming said first digital image according to said geometric transformation having said determined parameters; and
detecting similarity between the content of said transformed first digital image and said second digital image.

46. The method of claim 45 wherein said meta-data of each said digital image file indicates a location of each of one or more objects of interest in the respective said digital image.

47. The method of claim 45 wherein said meta-data of each said digital image file indicates a classification of each of one or more objects of interest in the respective said digital image.

48. A method for detecting a geometrically transformed copy of content in at least a portion of an image, said method comprising the steps of:
providing first and second digital image files, said digital image files including first and second digital images, respectively, each said digital image file including meta-data additional to the respective said digital image, said meta-data of each said digital image file indicating locations of feature points on each of one or more objects of interest in each said digital image;
identifying one or more object of interest pairs, each said pair having corresponding said objects of interest in said first and second digital images;
locating said feature points on each said object of interest in each said digital image using said metadata;
matching said feature points of said objects of interest in each of said object of interest pairs to generate a set of correspondence points in each said digital image;
choosing one of a predetermined plurality of geometric transformations to provide a chosen tranformation, said transformations having different numbers of parameters, said choosing being based on relative numbers of said parameters in respective said transformations and said correspondence points in said set;
determining parameters of said chosen transformation that relates said set of correspondence points in said first digital image into said set of correspondence points in said second digital image;
transforming said first digital image according to said geometric transformation having said determined parameters; and
detecting similarity between the content of said transformed first digital image and said second digital image.

49. A method for detecting a geometrically transformed copy of content in at least a portion of an image, said method comprising the steps of:
locating one or more objects of interest in first and second digital images;
identifying one or more object of interest pairs, each said pair having corresponding said objects of interest in said first and second digital images;
locating feature points on each said object of interest in each said digital image;

matching feature points of respective said objects of interest in each of said object of interest pairs to generate a set of correspondence points in each said digital image;

choosing a first of a plurality of predetermined geometric transformations to provide a chosen tranformation, said transformations each containing a number of parameters;

when the the number of parameters of said chosen transformation is exactly twice the number of correspondence points in each of said sets, determining values of the respective said parameters of said chosen transformation that map the set of correspondence points in the first digital image into the set of correspondence points in the second digital image;

when the number of parameters of said chosen transformation is less than said number of correspondence points in each of said sets, determining values of the respective said parameters of said chosen transformation that best fit the set of correspondence points in the first digital image into the set of correspondence points in the second digital image;

when the number of parameters of said chosen transformation is more than said number of correspondence points in each of said sets, repeating said choosing with another of said plurality of predetermined transformations to provide a new chosen transformation;

transforming the first digital image according to the determined values of the parameters of the respective geometric transformation; and detecting similarity between the content of said transformed first digital image and said second digital image.

* * * * *